United States Patent Office 3,183,076
Patented May 11, 1965

3,183,076
METHOD FOR MODIFYING THE GROWTH
CHARACTERISTICS OF PLANTS
John K. Leasure, Midland, and Dorsey R. Mussell, Clare, Mich., assignors to The Dow Chemical Company, Midland, Mich., a corporation of Delaware
No Drawing. Filed Feb. 5, 1962, Ser. No. 171,278
7 Claims. (Cl. 71—2.7)

This invention is concerned with the modification of the growth characteristics of plants and is particularly directed to compositions and methods for the suppression and control of the growth of germinant seeds, emerging seedlings and established plants of many undesirable weed species, and for promoting the maturing of crops and facilitating their harvest.

It is an object of the present invention to provide a new method for modifying the growth characteristics of plants and particularly of broad leaf plants. Another object is the provision of a method for the suppression and control of the growth of undesirable vegetation. A further object is the provision of a method for the suppression of the growth of seeds, emerging seedlings and established vegetation. An additional object is the provision of an improved method for promoting the maturing of crops prior to harvest and for facilitating the harvest of plant crops. Yet another object is the provision of an improved method for the defoliation of plants. Another object is the provision of novel compositions to be employed in these methods of growth modification. Other objects will become apparent from the following specification and claims.

According to the present invention, it has been discovered that the growth characteristics of many plants may be modified or altered by exposing plants or plant parts to the action of a growth-altering amount of a silane compound corresponding to the formula:

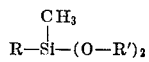

In this and succeeding formulae, R represents methyl, chloromethyl, ethyl or α-chlorethyl and R' represents hydrogen, lower alkyl or chloro-lower alkyl. In the present specification and claims, the expression "lower alkyl" is employed to refer to the alkyl radicals containing not in excess of 4 carbon atoms. More particularly, it has been discovered that the growth of germinant seeds, seedlings and established vegetation may be suppressed and inhibited by exposing the seeds, seedlings or the roots or above-ground portions of growing plants to the action of a growth-altering or growth-inhibiting amount of the silane compounds. It has been discovered further that with proper control of the dosage of the silane compounds, the maturation of many crop plants may be facilitated and their harvest promoted without substantial injury to that portion of the plant to be harvested. Moreover, it has been found that the compounds have a substantial degree of toxicity for many undesirable broad leaf plants and a lower toxicity for many narrow leaf plants. Thus, they are adapted to be employed for the selective control of broad leaf plants in stands of narrow leaf crop plants.

The silane compounds are liquid materials which are somewhat soluble in many organic solvents and of very little solubility in water. They are particularly adapted to be employed as active constituents in compositions for the alteration of the growth or the killing of plants and for the maturation of crop plants.

The exposure of a viable form of plants, or of plants and plant parts, to the action of the silane compounds gives rise to varying responses depending upon the nature of the plant or plant part, the stage of growth or maturity of the plant, the silane compound employed and the dosage of silane compound at which the exposure is carried out. When large dosages are dispersed in growth media, a persistent inhibition of the growth of the seeds, emerging seedlings and established plants of many plant species is obtained. The weathering action of the sun, rain and possibly the decomposition of the silane compounds by the action of bacteria, eventually reduces their concentration in the growth media. The application of large dosages to the foliage of established vegetation suppresses the growth of many broad leaf and narrow leaf plant species. Soil or foliar applications or more dilute dosages suppress and inhibit the growth of the seeds or established plants of many broad leaf plants while having little effect upon the seeds or established plants of many narrow leaf plants. Thus, it is possible to effect a selective control of undesirable broad leafed weeds in narrow leaf crop plantings.

Where plant maturation is concerned, the silane compounds are applied to the foliage of crops at a time near the end of their normal growing season and at a dosage sufficient to accelerate the maturing of the crop. This treatment accomplishes an early and uniform ripening of the fruit or other agricultural product and a rapid defoliation of the plant so as to facilitate the harvest of the crop. In certain instances, as with rice and milo, the treatment induces a dehydration effect which results in a decrease in the moisture content of the grain. Such a treatment permits an early harvest of the grain crop.

The exposure of the plant to the action of a growth-altering amount of the silanes is essential for the practice of the present invention. The exact dosage to be employed to obtain such exposure is dependent upon such factors as soil type, depth to which the compounds are distributed in the soil, the amount of rainfall as well as upon the plant species to be controlled and the stage of growth thereof. In non-selective herbicide applications, good results are obtained when the germinant seeds or established plants are exposed to dosages of from 10 to 50 pounds or more of the saline compounds per acre. In soil, good results are obtained when the compounds are distributed therein in amounts of from 0.5 to 100 parts or more by weight per million parts by weight of soil. In selective applications for the control of the growth of broad leaf plants in narrow leaf crop plantings, a dosage of from 0.25 to 10 pounds of the silane compounds per acre is desired. Where plant maturation is concerned, good results are obtained at dosages of from 0.1 to 10 pounds of the silane compounds per acre.

The method of the present invention may be carried out by applying to the above-ground portion of plants or by applying to the growth media the unmodified silane compounds. However, the present method also embraces the employment of a liquid or dust composition containing said compounds. In such usage, the compounds may be modified with one or more of a plurality of additaments or herbicide adjuvants such as water, petroleum distillates, or other organic solvent carriers, surface active dispersing agents and finely divided inert solids. Depending upon the concentration of the toxicant, such augmented compositions are adapted to be distributed in or on the soil or on the above-ground portion of the plants or employed as concentrates and subsequently diluted with additional inert carrier to produce the ultimate treating compositions.

The exact concentration of silane compounds to be employed in compositions for the treatment of growth media and plants is not critical and may vary considerably provided the required dosage of active agent is supplied in the growth media or upon the above-ground surfaces of plants. The concentration of toxicant in liquid compositions employed to supply the desired dosage generally is from about 0.1 to 50 percent by weight, although concentrations of 0.0001 percent by weight may be employed in irrigation treatments of soil. In dusts, the concentration of toxicant may be from 0.5 to 50 percent by weight, although concentrations as low as 0.1 percent are sometimes employed. In compositions to be employed as concentrates, the toxicant oftentimes is present in a concentration of from about 1 to 98 percent by weight.

The quantity of treating composition to be applied may vary considerably provided the required dosage of active ingredient is applied in sufficient of the finished composition adequately to cover the vegetation to be treated or to facilitate the penetration and distribution of the active ingredient in growth media. The required amount of active ingredient in the soil conveniently may be supplied per acre treated in from 40 to 27,000 gallons or more of the aqueous carrier, in 5 to 50 gallons of organic solvent or in from 50 to 2,000 pounds of inert solid carrier. In the treatment of seedling weeds, good coverage is obtained when using from 10 to 100 gallons or more of finished spray composition per acre. Where large succulent vegetation is concerned, it is frequently desirable to employ up to 250 gallons or more of the finished spray composition per acre to assure complete coverage of the above-ground portion of the vegetation. In the application of dusts to plant foliage, good results are obtained with from 50 to 2,000 pounds of finished dust composition per acre, the only requirements being that the required toxicant dosage be supplied in sufficient dust to achieve good coverage of the foliage.

Liquid compositions containing the desired amount of the silane compounds may be prepared by dissolving the toxicants in an organic liquid such as acetone, xylene or petroleum distillates or by dispersing the toxicants in water with or without the aid of a suitable surface active dispersing agent such as an ionic or non-ionic emulsifying agent. Tht aqueous compositions may contain one or more water-immiscible solvents for the silane compounds. In such compositions, the carrier comprises an aqueous emulsion, that is, a mixture of water-immiscible solvent, emulsifying agent and water. The choice of dispersing and emulsifying agent and the amount thereof employed is dictated by the nature of the composition type and by the ability of the agent to facilitate the dispersion of the compound in the carrier to produce the desired composition. Dispersing and emulfifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like. The surface active dispersing agents are generally employed in the liquid compositions in the amount of from 1 to 20 percent by weight of the combined weight of the silane compound and the surface active agent.

In the preparation of dust compositions, the silane compounds are dispersed in and on a finely divided inert solid such as talc, chalk, gypsum and the like. In such operations, the carrier is mechanically ground with the compounds or wet with a volatile organic solvent solution thereof.

Similarly, dust compositions containing the compound may be prepared from various of the solid surface active dispersing agents such as bentonite, fuller's earth, attapulgite and other clays. Depending upon the proportions of ingredients, these dust compositions may be employed as concentrates and subsequently diluted with additional solid surface active dispersing agent or with talc, chalk, gypsum and the like to obtain the desired amount of active ingredient in a composition adapted to be employed for the control of the growth of vegetation. Also, such concentrate dust compositions may be dispersed in water with or without the aid of a dispersing agent to form spray mixtures.

When operating in accordance with the present invention, growth-inhibiting amounts of the compounds or a composition containing the compounds are dispersed in any convenient fashion in soil or other growth media, i.e., by simple mixing with the growth media, by applying to the surface of soil and thereafter dragging or disking into the soil to the desired depth, or by employing a liquid carrier to accomplish the penetration and impregnation. The application of the spray and dust compositions to the surface of soil or to the above-ground surfaces of plants may be carried out by conventional methods, for example, with power dusters, boom or hand sprayers and spray dusters.

In a further method, the distribution in soil may be accomplished by introducing the toxicant in the water employed to irrigate the soil. In such procedure, the amount of water may be varied in accordance with the porosity and water-holding capacity of the soil in order to obtain the desired depth of distribution of the toxicant.

The following examples illustrate the present invention but are not to be construed as limiting.

*Example 1*

Four parts by weight of various of the silane compounds, 0.08 part by weight of sorbitan trioleate (Span 85) and 0.02 part of a sorbitan monolaurate polyoxyethylene derivative (Tween 80) were dispersed in 40 milliliters of acetone to produce concentrate compositions in the form of water-dispersible liquids containing one of the silane compounds as the active agent. Portions of these concentrate compositions were dispersed in water to produce aqueous spray compositions containing 10,000 parts by weight of one of the silane compounds per million parts by weight of ultimate mixture. These compositions were applied to the foliage of plots of various plant species which were about 4 inches tall. The treatments were carried out with conventional spraying equipment, the plants being sprayed to the point of run off. Similar plots of the various plane species were left untreated to serve as checks. After about 2 weeks, the plots were examined to ascertain what control of the growth of the plants had been obtained. The compounds and plant species employed, together with the results obtained, are set forth in the following table.

| | Chloromethyl Diisopropoxy Methyl Silane | 1-Chloroethyl Dimethoxy Methyl Silane | Chloromethyl Diethoxy Methyl Silane | Chloromethyl Dimethoxy Methyl Silane |
|---|---|---|---|---|
| Pig weed | 100 | 100 | 100 | 100 |
| Cucumber | 99 | 98 | 98 | 100 |
| German millet | 100 | 80 | 98 | 100 |
| Pinto bean | 100 | 95 | 100 | 100 |
| Marigold | 100 | 60 | 100 | 100 |
| Corn | 20 | 0 | 20 | 30 |
| Crab grass | 40 | 60 | 95 | 70 |
| Wild oats | 30 | 20 | 80 | 20 |

At the time of the observations, the untreated check areas showed vigorously growing stands of the named plant species.

*Example 2*

A water-dispersible concentrate composition was prepared from bis(2-chloroethoxy) chloromethyl methyl silane in the manner exactly as described in Example 1 and the resulting concentrate dispersed in water to prepare aqueous compositions containing 10,000, 5,000 and 2,000 parts by weight of the silane compound per million parts by weight of ultimate mixture. These compositions were applied to the foliage of several plant species and employed as described in Example 1 for post-emergence plant growth control. Two weeks following the applications, the plants were examined to ascertain what control of the growth and killing of the plants had been obtained. The plants employed and the results obtained with the indicated treatment compositions are set forth in the following table.

| | Percent Control of the Growth and Killing of Plants at the Indicated Dosage in Parts Per Million | | |
|---|---|---|---|
| | 10,000 p.p.m. | 5,000 p.p.m. | 2,000 p.p.m. |
| Pig weed | 100 | 100 | 100 |
| Cucumber | 98 | 95 | 98 |
| German millet | 100 | 95 | 85 |
| Pinto bean | 100 | 90 | 70 |
| Marigold | 100 | 100 | 95 |
| Corn | 30 | 20 | 0 |
| Crab grass | 0 | 0 | 0 |
| Wild oats | 10 | 0 | 0 |

At the time of the observations, the untreated check areas showed vigorously growing stands of the named plant species.

Example 3

Four parts by weight of chloromethyl diethoxy methyl silane, 0.08 part of sorbitan trioleate (Span 85) and 0.02 part of a sorbitan monolaurate polyoxyethylene derivative (Tween 80) were dispersed in 40 milliliters of acetone to produce a concentrate composition in the form of a water-dispersible liquid. A portion of this concentrate composition was dispersed in water to produce aqueous spray compositions containing 0.0086, 0.0172, 0.0432 and 0.172 pound of the silane compound per 100 gallons of ultimate mixture. The aqueous compositions were employed for the treatment of soil and observations made of the control of the growth of seeds and emerging seedlings of various plants. In the determinations, the compositions were employed to treat seed beds which had been prepared and seeded with the named plant species. In the treating operations, the compositions were applied as a soil drench and at a rate of about 0.434 acre inch of aqueous composition per acre to supply uniform dosages of about 1, 2, 5 and 20 pounds, respectively, of the silane compound per acre. These dosages correspond, respectively, to concentrations of about 1.6, 3.2, 8 and 32 parts by weight of the silane compound per million parts by weight of soil. Other areas similarly seeded with the named plant species were left untreated to serve as checks.

After about 4 weeks, the areas were examined to ascertain what control of the growth of seeds and emerging seedings had been obtained. The results are set forth in the following table.

| | Percent Control of the Growth of Seeds and Emerging Seedlings at the Various Indicated Concentrations of Toxicant in the Treated Seed Beds | | | |
|---|---|---|---|---|
| | 1.6 p.p.m. | 3.2 p.p.m. | 8 p.p.m. | 32 p.p.m. |
| Tomato | 20 | 100 | 100 | 100 |
| Cranberry beans | 50 | 80 | 100 | 100 |
| Radish | 0 | 0 | 40 | 80 |
| Japanese millet | 40 | 60 | 95 | 100 |
| Corn | 0 | 0 | 60 | 90 |
| Sudan grass | 0 | 60 | 95 | 100 |
| Sugar beets | 95 | 100 | 100 | 100 |
| Peas | 80 | 80 | 100 | 100 |
| Red beets | 100 | 100 | 100 | 100 |
| Sweet peppers | 0 | 0 | 98 | 100 |
| Sweet corn | 0 | 0 | 30 | 90 |
| Lettuce | 98 | 100 | 100 | 100 |
| Wax beans | 80 | 90 | 98 | 100 |
| Carrots | 0 | 60 | 99 | 100 |
| Spinach | 100 | 100 | 100 | 100 |
| Cucumber | 90 | 100 | 100 | 100 |
| Turnip | 0 | 0 | 60 | 99 |
| Squash | 60 | 99 | 100 | 100 |
| Cabbage | 0 | 0 | 90 | 100 |
| Onion | 60 | 90 | 90 | 100 |
| Lima beans | 0 | 95 | 100 | 100 |

Example 4

Chloromethyl dimethoxy methyl silane was formulated with Span 85, Tween 80 and acetone as described in Example 1 to produce a water-dispersable concentrate composition. A portion of this composition was dispersed in water to prepare aqueous spray compositions containing 1.0 and 0.5 percent by weight of the silane compound. These aqueous compositions were employed for the maturation and defoliation of cotton. In such operations, the cotton plants were uniformly sprayed with the aqueous compositions to the point of run off. The cotton was of the Acala variety, from 24 to 26 inches in height, and in bloom with a number of small bolls having been set. Adjacent plots of cotton in a similar stage of growth were left untreated to serve as checks.

About 2 weeks following treatment, the cotton plants were inspected to ascertain the percent defoliation or maturation that had taken place. The observations showed that there was 100 percent defoliation of the cotton at both dosages of treatment with the silane compound. At the time of observation, the stands of check plants were in rank growth and exhibited no tendency of maturation and no defoliation.

Example 5

Water-dispersible concentrate compositions were prepared from various of the silane compounds in the manner exactly as described in Example 1 and portions of the resulting concentrates dispersed in water to prepare aqueous compositions containing 0.172 pound of one of the silane compounds per 100 gallons of ultimate mixture. These compositions were employed as described in Example 3 for the treatment of soil and observations made of the control of the growth of the seeds and emerging seedlings of various plant species. The planting and treating operations were all as previously described with the compositions being employed in an amount sufficient to supply 20 pounds of one of the silane compounds per acre. This dosage corresponds to a concentration of about 32 parts by weight of silane compound per million parts by weight of soil.

After about 4 weeks, the areas were examined to ascertain what control of the growth of seeds and emerging seedlings had been obtained. The silane compounds and plant species employed together with the results obtained are set forth in the following table.

| | Bis(2-Chloroethoxy) (Chloromethyl) Methyl Silane | Chloromethyl Diisopropoxy Methyl Silane | 1-Chloroethyl Dimethoxy Methyl Silane | Chloromethyl Dimethoxy Methyl Silane |
|---|---|---|---|---|
| Pig weed | 100 | 100 | 100 | 100 |
| Cucumber | 100 | 99 | 99 | 100 |
| German millet | 100 | 100 | 100 | 100 |
| Pinto bean | 100 | 100 | 98 | 100 |
| Marigold | 100 | 100 | 100 | 100 |
| Japanese millet | 99 | 100 | 90 | 100 |
| Corn | 100 | 60 | 70 | 90 |
| Crab grass | 100 | 100 | 80 | 100 |
| Wild oats | 20 | 50 | 30 | 60 |

Example 6

Aqueous dispersions containing 1.0 percent by weight of various of the silane compounds were employed as described in Example 4 for the defoliation of cotton. The treating operations were all as previously described with the plants being about 20 inches tall and in the prebloom stage.

About 2 weeks following treatment, the cotton plants were inspected to ascertain the percent defoliation that had taken place. The silane compounds employed together with the results of the observations are set forth in the following table.

Test compound: Percent defoliation of cotton
Bis(2-chloroethoxy) chloromethyl methyl silane _____ 98
Chloromethyl diethoxy methyl silane _____ 98
Diisopropoxy chloromethyl methyl silane _____ 98
Dimethoxy 1-chloroethyl methyl silane _____ 98

At the time of the observations, the check stands of cotton plants were found to be in rank growth and exhibited no defoliation or maturation.

Example 7

An aqueous composition containing 0.0432 pound of diethoxy chloromethyl methyl silane was prepared exactly as described in Example 3 and the resulting composition employed as described in said example for the treatment of soil which was supporting the growth of mature cranberry bean plants. In such operations, the composition was applied as a soil drench and at a rate of about 0.434 acre inch of aqueous composition per acre to supply a uniform dosage of about 5 pounds of the silane compound per acre. Adjacent areas supporting mature stands of cranberry bean plants were left untreated to serve as checks. After about 2 weeks, the stands were examined to ascertain what percent defoliation of the plants had been obtained. As a result of the observations, there was found a 100 percent defoliation of the bean plants in the areas treated with the silane compound. At the time of the observations, the stands of mature cranberry bean plants in the untreated check areas were found to be in abundant growth and showed no maturation or defoliation.

Example 8

One quarter of a pound of an alkylated aryl polyether alcohol (Triton X-100) is added with stirring to an aqueous dispersion containing 1 pound of dimethyl silane diol per 100 gallons of ultimate mixture to produce an aqueous spray composition. In a similar manner, an aqueous spray composition is prepared containing 1 pound of chloromethyl methyl silane diol.

Twenty five parts by weight of dimethyl dibutoxy silane, dimethyl di(2-chloroisopropoxy) silane and dimethyl dipropoxy silane are each separately mixed with 65 parts of xylene and 10 parts of Triton X-100 to prepare liquid emulsifiable concentrate compositions containing one of the silane compounds.

In a similar manner, 90 parts by weight of dimethyl dimethoxy silane and dimethyl diethoxy silane are each mixed with 10 parts of a sorbitan monolaurate polyoxyethylene derivative (Tween 80) to produce concentrate compositions in the form of water-dispersible liquids containing one of the silane compounds.

Also, 25 parts by weight of chloromethyl dimethoxy methyl silane, 60 parts of fuller's earth, 10 parts of diatomaceous earth, 2 parts of an alkyl sulfonate (Nacconol NR) and 1 part of a polymerized sodium salt of substituted benzoid alkyl sulfonic acid (Daxad No. 27) are mechanically mixed and ground together to prepare a concentrate composition in the form of a wettable powder.

These concentrate compositions are dispersed in water to prepare aqueous compositions which have very desirable wetting and penetrating properties. The latter aqueous compositions and the aqueous spray compositions as above prepared are adapted to be employed to distribute the silane compounds in the soil or upon the foliage of plants in growth-altering amounts.

The dialkyl ethers of the dialkyl silane diols, as employed in accordance with the present teaching, are prepared by known methods as described in British Patent 573,906. The bis(chloroalkyl) ethers of the diol compounds, employed as aforedescribed, are prepared in known procedures by reacting a dialkyl silicon dichloride or haloalkyl methyl silicon dichloride with a suitable alkylene oxide or an alkali metal alkanolate. The haloalkyl alky silicon dichlorides therein employed are prepared in known fashions by the chlorination of a suitable dialkyl silicon dichloride. The dialkyl silane diols and chloroalkyl methyl silane diols to be employed as herein described are prepared by the hydrolysis of the corresponding ester materials.

What is claimed is:
1. A method which comprises exposing plants and plant parts to the action of a growth-altering amount of a silane compound having the formula

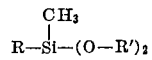

wherein R represents a member of the group consisting of methyl, chloromethyl, ethyl and α-chloroethyl and R' represents a member of the group consisting of hydrogen, lower alkyl and chloro-lower alkyl.

2. A method which comprises applying to plants and plant parts a silane compound having the formula:

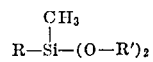

wherein R represents a member of the group consisting of methyl, chloromethyl, ethyl and α-chloroethyl and R' represents a member of the group consisting of hydrogen, lower alkyl and chloro-lower alkyl, said compound being applied at a dosage of at least 0.1 pound per acre.

3. A method which comprises exposing plants and plant parts to a growth-altering amount of chloromethyl diethoxy methyl silane.

4. A method which comprises exposing plants and plant parts to a growth-altering amount of chloromethyl dimethoxy methyl silane.

5. A method which comprises exposing plants and plant parts to a growth-altering amount of dimethyl dimethoxy methyl silane.

6. A method which comprises exposing plants and plant parts to a growth-altering amount of chloromethyl methyl silane diol.

7. A method which comprises exposing plants and plant parts to a growth-altering amount of 2-chloroethyl dimethoxy methyl silane.

References Cited by the Examiner
UNITED STATES PATENTS

| | | | |
|---|---|---|---|
| 2,887,371 | 5/59 | Bennett et al. | 71—2.7 |
| 2,923,095 | 2/60 | Mogimel-Pelonnier et al. | |
| 2,930,809 | 3/60 | Gel et al. | 71—2.7 |

FOREIGN PATENTS 572,906  12/45  Great Britain.

OTHER REFERENCES

Chrzczonowicz et al.: C.A., vol. 55, col. 20941(c), 1961.

LEWIS GOTTS, *Primary Examiner.*

M. A. BRINDISI, JULIAN S. LEVITT, *Examiners.*